United States Patent [19]

Suarez-Gonzalez et al.

[11] Patent Number: 4,657,386

[45] Date of Patent: Apr. 14, 1987

[54] IN-FLIGHT ENGINE CONTROL OPTICAL PYROMETER

[75] Inventors: Ernesto Suarez-Gonzalez, Tequesta; Dean A. Kepple, Jupiter, both of Fla.

[73] Assignee: United Technologies Corporation, Hartford, Conn.

[21] Appl. No.: 798,214

[22] Filed: Nov. 14, 1985

[51] Int. Cl.$^4$ .............................................. G01J 5/60
[52] U.S. Cl. ...................................... 356/45; 356/43; 374/127
[58] Field of Search ............................ 356/43, 44, 45; 374/120, 121, 127; 350/582, 587, 589

[56] References Cited

U.S. PATENT DOCUMENTS 4,222,663 9/1980 Gebhart et al. ...................... 356/45
4,326,798 4/1982 Kahn .................................... 356/45

OTHER PUBLICATIONS

T. G. R. Beynon, "Radiation Thermometry Applied to the Development and Control of Gas Turbine Engines", *American Institute of Physics*, 1982, pp. 471–477.
W. H. Atkinson, R. R. Strange, "Pyrometer Temperature Measurements in the Presence of Reflected Radiation", *Proceedings of the Conference of the American Society of Mechanical Engineers*, Aug. 1976, pp. 1–8.

*Primary Examiner*—Eugene R. LaRoche
*Assistant Examiner*—Robert J. Pascal
*Attorney, Agent, or Firm*—J. Kevin Grogan

[57] ABSTRACT

A novel dual spectra optical pyrometer for use in in-flight control of jet engines includes an optical probe containing a shutter sensitive to the air pressure within the jet engine. The shutter provides an optical beam from rotating turbine blades to an optical fiber only above a threshold pressure. A serial array of photodetectors receives the optical beam and provides first and second signals therefrom. A signal processor receives the first and second signals as well as signals indicative of the energy ratio therebetween, and provides reflection corrected energy signals from the difference between the first signals and the product of the energy ratio signals and the second signals.

5 Claims, 5 Drawing Figures

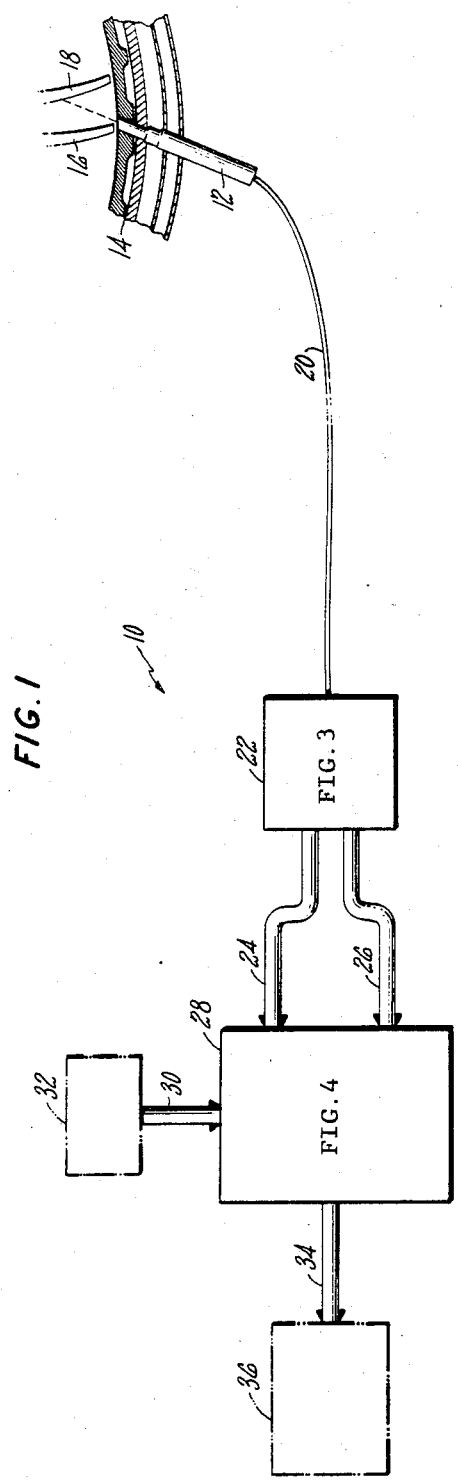

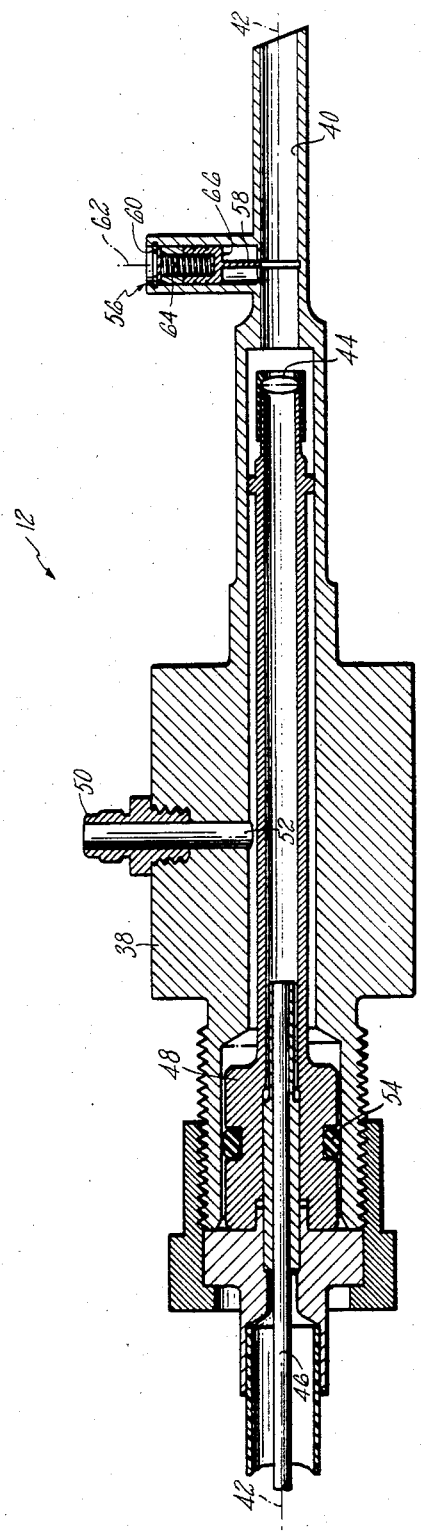

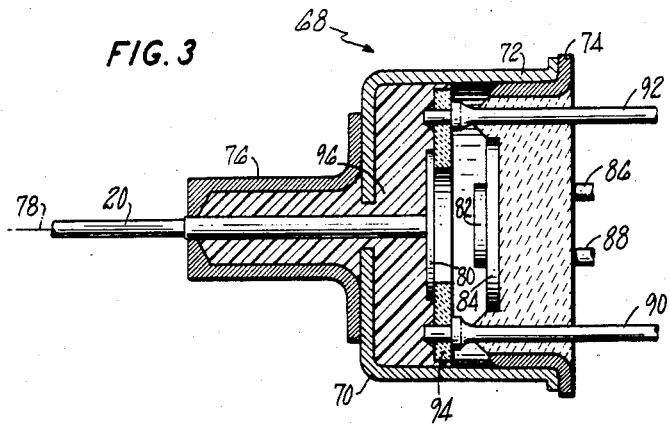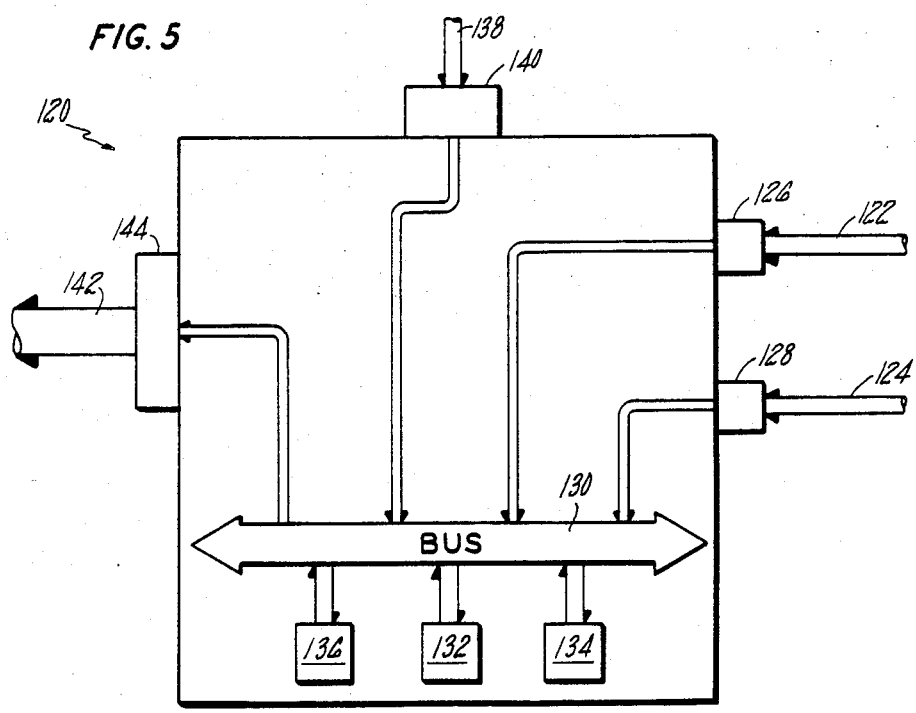

IN-FLIGHT ENGINE CONTROL OPTICAL PYROMETER

TECHNICAL FIELD

This invention relates to optical pyrometers and more particularly to optical pyrometers used for in-flight control of jet engines.

BACKGROUND ART

Dual spectral area optical pyrometers are well known in the art and are used extensively in jet engine diagnostic testing. Dual spectral area optical pyrometers have been developed in order to differentiate between reflected and emitted radiation received from a target turbine blade and compensate for the error in the observed temperature that the reflected radiation introduces. In U.S. Pat. No. 4,222,663, Gebhart, et al discloses a dual band (two color) optical pyrometer which comprises two separate pyrometers. Each pyrometer sees a different but overlapping component of the total spectral range of the light or radiation from the turbine blade.

Prior art dual spectral area optical pyrometers usually comprise an optical probe fitted into the bottom of the jet engine housing. Radiation from the rotating turbine blades is collected by the probe and provided to a fiber optic bundle which guides the optical beam to a detection module. A bifurcated fiber optic coupler is most often used to divide the optical beam into two optical beams, one of which passes through a conventional optical filter whose passband is selected to be less than the spectral width of the optical beam from the turbine blade. Photodetectors receive the optical beams and provide energy signals to a signal processor. The received energy signals are converted to linearized temperature signals. The signal processor provides corrected temperature signals.

Dual spectral areas optical pyrometers of the prior art have been limited to use as diagnostic tools for several reasons. The location of the optical probe is typically restricted to the bottom of the jet engine housing. As a result, dirt and moisture contaminate the optics used to gather the turbine blade radiation, requiring frequent cleaning. This problem is most acute during initial engine start-up and again during engine shutdown.

In addition, prior art detection modules are bulky and have optical components whose alignment can be deleteriously affected by mechanical vibration. The detection modules typically comprise a bifurcated fiber optic coupler which simply divides the target optical beam in two. A conventional optical filter is inserted in one of the two beams output therefrom. Consequently, the optical division is not spectral band sensitive, which wastes a portion of the radiation in each beam and limits the signal-to-noise ratio available.

The signal processors used in the prior art are hardware intensive because of the elaborate processing which must be performed in generating linearized temperature signals and in computing corrected temperature signals. Moreover, amplifiers must be selected to accommodate the large dynamic range of the energy signals at the expense of useful signal bandwidth. Consequently, the signal processors of the prior art are inappropriate for in-flight applications for engine control.

DISCLOSURE OF INVENTION

An object of the present invention is to provide a dual spectral optical pyrometer for measuring the temperature of turbine blades in a jet engine for use in engine control applications during flight.

According to the present invention, an in-flight engine control optical pyrometer for measuring the temperature of turbine blades in a jet engine includes an optical probe that is positioned in the jet engine to optically view the turbine blades. An optical beam gathered therefrom has a spectral width and has an emitted component from the turbine blade and a reflected component from the jet engine fireball which has an equivalent black body temperature. Also included is a sight tube which has an inner bore that is adapted to receive the turbine blade optical beam and which positions an optical guide therein. The sight tube further includes a shutter that is responsive to air pressure within the jet engine and which provides the turbine blade optical beam to the optical guide only above a selected threshold magnitude of the air pressure. The optical pyrometer also includes an optical detection module that has a housing which receives the optical guide. A first photodetector is contained within the housing which absorbs from the turbine blade optical beam a first optical component that has a first spectral width selected to be a portion of the target beam spectral width. The first photodetector provides an electrical signal equivalent of the first optical component. A second photodetector contained within the housing receives a remainder optical beam passed from the first photodetector and provides an electrical signal equivalent thereof. Also included is a signal processor which receives the first and second signals and further receives energy ratio signals. The signal processor provides reflection corrected energy signals from the difference between the first signal and the product of the energy ratio signal and the second signal.

BRIEF DESCRIPTION OF THE DRAWINGS

FIG. 1 is a simplified block diagram of an in-flight engine control optical pyrometer provided according to the present invention;

FIG. 2 is a sectioned illustration of an optical probe having an air pressure sensitive shutter provided according to the present invention;

FIG. 3 is a sectioned illustration of a serial array detector module provided according to the present invention;

FIG. 4 is an expanded block diagram of a signal processor for use with the in-flight engine control optical pyrometer of FIG. 1; and FIG. 5 is an alternative digital embodiment of the signal processor of FIG. 4.

BEST MODE FOR CARRYING OUT THE INVENTION

Referring first to FIG. 1, in a simplified block diagram of an in-flight engine control optical pyrometer provided according to the present invention, an in-flight engine control optical pyrometer 10 includes probe 12 mounted in casing 14 of a jet engine. The probe should be positioned to optically view a target such as rotating turbine blades 16 and 18.

In an operating jet engine the blades of the turbine reach an elevated temperature. As such they emit radiation, the intensity and spectral distribution of which is a function of temperature and can usually be estimated by the well known "black body" approximation or "grey body" approximation if some emissivity compensation is introduced. In addition, radiation (light) from the jet engine fireball is reflected off the target turbine blade and also comprises part of the turbine blade optical beam. The temperature of the combustion flame or fireball is substantially higher than that of the turbine blade, and as a result, the sum of the two light or radiation beams produces a spectral energy distribution which yields an equivalent black body temperature much higher than the actual temperature of the turbine blade. The light from the target turbine blade has a spectral width and comprises a turbine blade optical beam.

The probe is positioned in the jet engine housing and receives the turbine blade optical beam. As detailed hereinafter with respect to FIG. 2, the probe comprises a sight tube having conventional light gathering optics positioned in an inner bore such that the turbine blade optical beam is received, focused and provided to an optical fiber (low temperature environments). For high temperature applications, a sapphire rod or fused fiber optic bundle may be inserted prior to the fiber optic cable. An air pressure sensitive shutter is positioned in the sight tube so as to seal the optical components from the engine environment when the ambient air pressure is below a selected threshold magnitude, thereby reducing the amount of contamination input to the sensitive optics.

The turbine blade optical beam is received by an optical guide 20 secured inside the probe by conventional techniques. The guide is conventional and typically comprises a fused fiber optic bundle or conventional wide band quartz or fused silica type. As detailed hereinafter with respect to FIG. 3 the turbine blade optical beam is provided to detection module 22. In the best mode embodiment the detection module comprises a first photodetector absorbing a first component of the target beam having a spectral width selected to be a portion of the turbine blade optical beam and transmitting therethrough the remainder thereof. Also included is a second photodetector serially positioned thereafter, absorbing the remainder optical beam. The serial positioning of the second photodetector relative to the first produces spectral band division between the two, as the first photodetector filters the radiation provided to the second photodetector. With a detection module provided according to the present invention, coupling efficiencies into the two photodetectors are almost 100% of the entire respective spectral ranges.

The first photodetector provides signals on lines 24 which are indicative of the received energy of first component beam and comprises a first signal channel whose spectral band corresponds to that of first component beam. Similarly, the second photodetector comprises a second signal channel whose spectral band is limited to that of the remainder optical beam and provides signals on lines 26 indicative thereof.

These signals are received by signal processor 28. As detailed hereinafter with respect to FIG. 4, the signal processor computes from all of the received signals a reflection correction energy signal (E) defined as $$E = E_1 - RE_2, \quad (1)$$

where $E_1$ and $E_2$ correspond to the signal magnitudes received from the first and second photodetectors, respectively. R is an energy ratio signal defined hereinafter with respect to FIG. 4 and is received on lines 30 from external apparatus 32.

The parameter E is a function of the emitted radiation from the target only, and as such is directly related to the correct or true temperature of the blade. Given an estimated equivalent black body temperature of the fireball and the spectral characteristics of detectors and filters, a functional relationship can be determined between the correct temperature and the reflection corrected energy signal (E). Although this relationship is double valued, it is singular over the temperature range of interest. Depending upon the application, the signal processor provides on lines 34 to engine control processors 36 either computed reflection corrected signals (E) or corrected temperature signals corresponding thereto which comprise feedback signals and allow for closed loop operation of the jet engine.

Unlike prior art dual spectra optical pyrometers which must linearize both energy signals and determine a black body temperature for each signal channel, the in-flight engine control optical pyrometer provided according to the present invention does not require linearization of either received energy signal. Moreover, the dynamic range of the reflection corrected energy signal (E) is substantially smaller than that of the filtered and unfiltered energy signals, reducing demands on signal processor hardware and increasing signal processing speed by simplifying the needed computations.

FIG. 2 is a sectioned illustration of a portion of optical probe 12 used in the in-flight engine control optical pyrometer of FIG. 1. The probe includes a sight tube 38 which is conventionally fitted into casing (14, FIG. 1) of the jet engine. For example, the probe for a typical jet engine is made from stainless steel, and is located on the suction side of the first turbine. The sight tube possesses an inner bore 40 having a longitudinal axis 42 in which ordinary light gathering optics such as sapphire lens 44 are fixed.

In the best mode embodiment, the spot size of the turbine blade optical beam is approximately 0.200 inches and is positioned approximately 3.5 inches from the turbine blade mandating an inner bore diameter greater than 0.442 inches. Additionally, apparatus for preventing internal reflections such as a conventional helical spring or aperture may be included in the inner bore.

The turbine blade optical beam is provided to optical fiber 46 located within the bore by a conventional retainer 48 which includes means for locating the optical fiber along the bore longitudinal axis. The optical fiber or fused fiber optic bundle should be selected to receive all the energy of the focused turbine blade optical beam. The probe also includes fitting 50 for receiving purge gas from an external source. The gas is provided to the probe inner bore by an appropriate aperture 52 in the sight tube. The probe is sealed by a conventional O-ring 54. Not shown in FIG. 2 are adaptations to the sight tube for mounting in the jet engine which are conventional and vary with engine type.

An optical shutter 56 is positioned within the sight tube inner bore to be responsive to the air pressure within the jet engine and to receive the turbine blade optical beam from the turbine blades as they rotate.

The shutter operates to seal the light gathering optics and optical fiber within the inner bore until the air pressure within the jet engine exceeds a preselected threshold magnitude. The shutter remains open as long as that threshold is exceeded. For example, with a typical jet engine the shutter threshold is set at approximately 50 lbs. When the engine air pressure drops below this magnitude the shutter closes.

In the best mode embodiment the shutter comprises a movable piston 58 positioned in sight tube outer recess 60 about an axis 62 perpendicular to the inner bore longitudinal axis. Spring 64 is of a conventional helical type and is positioned behind the movable piston exerting a force parallel to the piston axis.

The air pressure within the shutter housing exerts a force perpendicular to the surfaces contained within. The air pressure will exert a force on piston surface 66 that is parallel to the piston axis, and opposing the restoring force of the spring. The magnitude of the force will be a function of the surface area as well as the air pressure.

As the air pressure increases, the force exerted on the pistons will increase such that beyond a certain magnitude the air pressure force will exceed the spring restoring force, thereby moving the piston away from the sight tube longitudinal axis, allowing the turbine blade optical beam to pass. The magnitude of the restoring force is well known to be a function of the spring parameters (coil diameter, coil thickness, etc.), and should be selected in conjunction with piston surface area engine air pressure.

Those skilled in the art will note that other shutter configurations including opposing pistons with wedge or parabolic cross section geometries may be equivalently substituted. Moreover, other equivalent restoring means such as an electrical solenoid may be substituted for the spring.

In the best mode embodiment purge gas is provided in selective quantities to the sight tube to activate the shutter as well as cool the probe components and further reduce contamination. The purge gas is bled from the jet engine compressor by conventional techniques.

FIG. 3 is a sectioned illustration of a serial array photodetector module for use with the optical pyrometer of FIG. 1. The serial array photodetector module 68 includes housing 70 which is of a conventional type such as a TO-5 or TO-8 including metal header 74 and case 72 that have been appropriately modified. The housing also includes waveguide connector 76 which is attached by conventional techniques to the case. In the best mode embodiment the case has been modified by drilling a hole through the center so that the optical fiber (20, FIG. 1) is attached to the waveguide connector and can pass therethrough, defining optic axis 78.

Positioned on the header is a serial detector array comprising photodetectors 80 and 82. Photodetector 82 is mounted by conventional techniques to the header. To enhance long wavelength responsivity, a metal layer 84 is fabricated underneath photodetector 82. Electrodes 86 and 88 are only partially shown and provide electrical contact with photodetector 82 mounted along the optic axis. In addition, the case has provision for insulated standoff electrodes 90 and 92 which pass through the header allowing ceramic washer 94 to be positioned coaxially with the optic axis, immediately above photodetector 82. The ceramic washer is of a conventional type and has an annular opening. Photodetector 80 is mounted on the ceramic washer directly over the opening by conventional techniques approximately parallel to photodetector 82. Electrical contact is provided to photodetector 80 through electrodes 90 and 92 by conventional techniques, including, in the best mode embodiment, metallic contacts fabricated on the top surface of the ceramic washer.

The metal case is slid over the header positioning the optical fiber in substantial contact with photodetector 80 such that the target optical beam exits the optical fiber, and is provided thereto absorbing from the turbine blade optical beam a first component thereof. The remainder of the target optical beam passes through photodetector 80 and is provided to photodetector 82. A conventional encapsulant 96 such as a silicone epoxy is used in the gap between the header and case and the optical fiber, thereby sealing out moisture and other contaminants.

Dual spectra optical pyrometers of the prior art usually have photodetectors comprised of silicon. Silicon photodetectors are reliable as well as inexpensive, and display little drift in performance as a function of temperature. Overlap in the spectral bands which results by using the same material for both photodetectors creates inherent performance limitations. The signal-to-noise ratio is limited because most of the energy in the target optical beam is at wavelengths longer than those absorbed by silicon. Moreover, the component of the target beam reflected off of the turbine blade has a very weak intensity; the overlap between spectral bands further reduces available signal-to-noise ratios.

The serial array photodetector module provided according to the present invention not only has the advantages of mechanical stability and fewer optical components, but the negligible overlap between the responsivity of the photodetector materials ensures inherently greater signal-to-noise ratios.

In the best mode embodiment, the first photodetector in the serial array comprises silicon. As indicated hereinabove with respect to FIG. 2, when the turbine blade optical beam is incident on the first photodetector (80, FIG. 3), the silicon will substantially absorb that portion thereof having wavelengths between 0.4 and 1.05 microns. The remainder of the turbine blade optical beam will pass through the silicon and be provided to the second photodetector (82, FIG. 3) which is responsive to light having wavelengths between 1.05 and 1.8 microns. In the best mode embodiment photodetector 82 comprises an indium gallium arsenide photodiode which is selected because of its responsivity and high frequency response plus a relatively low dark current and noise at moderate ambient temperatures. Those skilled in the art will note that other infrared detecting materials, such as germanium, may be substituted.

In addition, the serial array photodetecting module provided hereinabove has improved high frequency response because it possesses efficient radiant power signal transfer between the optical fiber and the photodetectors. Photodetector 80 receives a total radiant optical power exiting the waveguide except for a small coupling loss at the optical fiber detector interface. Photodetector 82 receives approximately all of the incident power from approximately 1.05 microns to the upper limit of its responsivity range, approximately 1.8 microns in the best mode embodiment. This includes over 75% of the highest output portion of its response range, enhancing the pyrometer's overall signal-to-noise performance.

FIG. 4 is an expanded block diagram of the signal processor 28 used in the optical pyrometer of FIG. 1. The target optical beam from the turbine blade comprises thermal energy $E_t$ that is the sum of the energy emitted by the blade, and the energy originating at the combustion flame or fireball that is reflected off the blade, namely $$E_t = E_b + E_r \qquad (2)$$

The subscripts b and r refer to blade emitted energy and fireball reflected energy, respectively. The turbine blade optical beam is subsequently divided by the detection module into two beams with different spectral widths as detailed hereinabove. $E_1 + E_2$ corresponds to the total energy received in the first and second (remainder) signal channels respectively.

The total energy can be expressed as $$E_1 = E_{1b} + E_{1r} \qquad (3)$$

$$E_2 = E_{2b} + E_{2r} \qquad (4)$$

At a given reflected energy equivalent black body temperature, the energy ratio between the two channels is constant, that is $$E_{1r}/E_{2r} = \text{constant} = R \qquad (5)$$

Consequently, the equation for the total energy in the first signal channel can be rewritten as $$E_1 = E_{1b} + RE_{2r} \qquad (6)$$

The reflected energy in the second channel becomes $$E_{2r} = E_2 - E_{2b} \qquad (7)$$

Substituting the expression for the second reflected energy ($E_{2r}$) into the equation for the total energy in the first channel results in $$E_1 - RE_2 = E_{1b} - RE_{2b} \qquad (8)$$

A new parameter, called reflection corrected energy (E) can be defined from equation (8)

$$E_1 - RE_2 = E = RE_{1b} - E_{2b} \qquad (9)$$

The lefthand side of equation (9) is a function only of the total (emitted plus reflected) energy in both channels, while the righthand side is only a function of the blade emitted energy. Consequently, the parameter E is a function only of the emitted energy from the turbine blade and remains unaffected by the presence of reflected energy from the combustion flame. Moreover, E can be obtained from the total observed energy in both signal channels, along with knowledge of the magnitude of the energy ratio.

The energy ratio (R) for the fireball or combustion flame of reflection equivalent black body temperature is computed and empirically verified typically by illuminating the detector module with radiation from a black body at a temperature which is approximately equal to the equivalent black body fireball temperature within the jet engine (e.g. 4500° F.).

Similarly, the relationship between E and the reflection corrected temperature is computed and empirically verified by supplying black body radiation of various temperatures (approximately 1300° F.) to the detection module for a given value of R. For each power ratio value of interest, a similar relationship is obtained. Once the relationship between E and the correct temperature is established, the configuration of the signal processor can then be determined.

In the best mode embodiment, the signals are processed in analog form for high speed and hardware simplicity. The energy signals are received on lines 24 and 26 and comprise photocurrent from photodetectors within the detector module (22, FIG. 1). Conventional transimpedance amplifiers 98 and 100 receive the energy signals and provide equivalent voltages on lines 102 and 104 to conventional wide band amplifiers 106 and 108. In addition, signals indicative of a power ratio magnitude (R) are received by amplifier 106 on lines 110. In the best mode embodiment the magnitude of R corresponds to an amplifier feedback adjustment, typically a variable feedback resistor having a selected magnitude.

Signals output from the wide band amplifiers correspond to $E_1$ and $RE_2$ respectively in equation 2. These signals are provided on lines 112 and 114 to a conventional difference amplifier 116 which provide the reflection corrected energy signals on lines 118 as defined hereinabove. The reflection corrected energy signals are used in present form as feedback in an engine control circuit. Alternatively, the reflection corrected energy signals may be provided to engine control processors not shown and not part of the present invention, such as an on-board flight controller where they may be digitized and compared with reflection corrected energy signal magnitudes stored as a function of correct blade temperature in conventional lookup table format.

FIG. 5 is an alternative digital embodiment 120 of the signal processor of FIG. 4.

The signal processor receives energy signals on lines 122 and 124. These signals are converted by analog-to-digital converters 126 and 128 and are provided to bus 130. The signal processor includes conventional central processing unit (CPU) 132 and random access memory (RAM) 134 for storing signals. A compilation relating reflection corrected energy signals to correct temperature signals is stored in read only memory (ROM) 136 in conventional lookup table format.

The central processing unit computes the value of E from the input energy signals and an energy ratio signal received on lines 138 and digitized by digital to analog converter 140. With a reflection corrected energy signal magnitude, the signal processor selects the corresponding correct temperature signal value from the read only memory. The random access memory is accessed by the central processing unit when necessary during this process. Signals corresponding to the correct temperature are provided by the signal processor directly on lines 142 to external processors in certain applications or, alternatively, to digital to analog converter 144 and then provided to external analog electronics.

Alternatively, the digital signal processor can include a lookup table signal compilation relating energy ratio signals to fireball equivalent black body temperature signals additionally stored in read only memory 136 with signals described hereinabove with respect to ROM 136. In response to a fireball equivalent black body temperature signal, the signal processor initially selects the corresponding value of R in memory and proceeds to compute the reflection corrected energy signal as detailed hereinabove. Moreover, it is apparent to those skilled in the art that alternative algorithms employing other analog or digial hardware and software can be equivalently substituted.

Similarly, although the invention has been shown and described with respect to a best mode embodiment thereof, it should be understood by those skilled in the art that various other changes, omissions and additions thereto may be made therein without departing from the spirit and scope of the invention.

We claim:

1. An in-flight engine control optical pyrometer for measuring the temperature of a turbine blade in a jet engine, comprising:

optical probe means positioned in the jet engine so as to gather from the turbine blade an optical beam having a spectral width and having an emitted component from the turbine blade and a reflected component from a fireball having an equivalent black body temperature, said optical probe means includes sight tube means having an inner bore adapted to receive said turbine blade optical beam and positioning an optical guide means therein, said sight tube means further including shutter means responsive to said jet engine air pressure, positioned in said sight tube means and providing said turbine blade optical beam to said optical guide means only above a threshold magnitude of said air pressure;

optical detection module means, including housing means adapted to receive the optical guide means;

first photodetector means contained within said housing means absorbing from the turbine blade optical beam a first optical component having a first spectral width selected to be a portion of the target beam spectral width and passing a remainder optical beam therethrough, said first photodetector means providing an electrical signal equivalent of said first optical component;

second photodetector means contained within said housing means receiving said remainder optical beam and providing an electrical signal equivalent thereof; and signal processing means receiving said first and second signals and further receiving energy ratio signals, for providing reflection corrected energy signals from the difference between said first signals and the product of said energy ratio signals and said second signal.

2. The in-flight engine control optical pyrometer of claim 1 wherein said signal processor means further comprises digital signal processing means having memory means for storing signals including signals indicative of a plurality of correct target temperature values each corresponding to an associated reflection corrected energy (E) signal magnitude, said digital signal processing means providing for receiving said first and second signals and further receiving energy ratio signals, generating a reflection corrected energy signal from the difference between said first signal and the product of said energy ratio signals and said second signal, identifying each of said reflection corrected energy signals with the related one of said plurality of said correct target temperature signals stored in said memory and providing signals indicative thereof.

3. The in-flight engine control optical pyrometer of claim 2, wherein said digital signal processing means further comprises signals stored in said memory means indicative of a plurality of energy ratio signals each corresponding to an associated fireball equivalent black body temperature signal, said signal processor further identifying received fireball equivalent black body temperature signals with the related energy ratio signal stored in said memory means.

4. The in-flight engine control optical pyrometer of claim 1, wherein said first photodetector comprises silicon.

5. The in-flight engine control optical pyrometer of claim 1, wherein said second photodetector comprises indium gallium arsenide.

* * * * *